US007739689B1

(12) United States Patent
Spertus et al.

(10) Patent No.: US 7,739,689 B1
(45) Date of Patent: Jun. 15, 2010

(54) INTERNAL MONITORING OF APPLICATIONS IN A DISTRIBUTED MANAGEMENT FRAMEWORK

(75) Inventors: Michael P. Spertus, Chicago, IL (US); Christopher D. Metcalf, Wellesley, MA (US); Richard Schooler, Cambridge, MA (US); David A. Stuckmann, Cary, IL (US)

(73) Assignee: Symantec Operating Corporation, Mountain View, CA (US)

( * ) Notice: Subject to any disclaimer, the term of this patent is extended or adjusted under 35 U.S.C. 154(b) by 1481 days.

(21) Appl. No.: 10/789,902

(22) Filed: Feb. 27, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. ....................... 719/317; 717/130
(58) Field of Classification Search ................. 719/317, 719/330; 717/130
See application file for complete search history.

(56) References Cited

U.S. PATENT DOCUMENTS

| 5,193,180 | A | * | 3/1993 | Hastings ..................... 717/163 |
| 5,655,081 | A | | 8/1997 | Bonnell et al. |
| 5,675,798 | A | * | 10/1997 | Chang ........................ 709/224 |
| 5,790,858 | A | * | 8/1998 | Vogel ......................... 717/130 |
| 5,903,758 | A | * | 5/1999 | Walker ........................ 717/130 |
| 5,918,004 | A | * | 6/1999 | Anderson et al. ............. 714/38 |
| 5,987,249 | A | * | 11/1999 | Grossman et al. ........... 717/130 |
| 6,332,213 | B1 | * | 12/2001 | Grossman et al. ........... 717/130 |
| 6,405,327 | B1 | | 6/2002 | Sipple et al. |
| 6,438,512 | B1 | * | 8/2002 | Miller ......................... 702/186 |
| 6,523,137 | B1 | * | 2/2003 | Stone ........................... 714/38 |
| 6,629,123 | B1 | * | 9/2003 | Hunt ........................... 718/106 |
| 6,671,876 | B1 | * | 12/2003 | Podowski .................... 717/130 |
| 6,748,555 | B1 | * | 6/2004 | Teegan et al. ................. 714/38 |
| 6,996,808 | B1 | * | 2/2006 | Niewiadomski et al. ..... 717/130 |
| 7,111,279 | B2 | * | 9/2006 | Gazdik et al. ............... 717/110 |
| 7,143,396 | B2 | * | 11/2006 | Suresh ........................ 717/130 |
| 7,152,058 | B2 | * | 12/2006 | Shotton et al. ................ 707/3 |
| 7,269,828 | B2 | * | 9/2007 | Civlin ......................... 717/158 |
| 7,281,242 | B2 | * | 10/2007 | Inamdar ...................... 717/130 |
| 7,287,247 | B2 | * | 10/2007 | Gschwind et al. ........... 717/130 |
| 7,293,259 | B1 | * | 11/2007 | Dmitriev .................... 717/130 |

(Continued)

OTHER PUBLICATIONS

Rational Software Corporation; Rational PurifyPlus, Rational Purify, Rational PureCoverage, Rational Quantify; Installing and Getting Started; Jun. 2003; Chapter 2, pp. 31-52.

(Continued)

*Primary Examiner*—Hyung S Sough
*Assistant Examiner*—KimbleAnn Verdi
(74) *Attorney, Agent, or Firm*—Meyertons, Hood, Kivlin, Kowart & Goetzel, P.C.

(57) ABSTRACT

Methods and systems are provided for internal monitoring of applications. A distributed management framework may comprise a plurality of applications and application servers, wherein each of the applications is configured to make function calls to standard programming functions. The function calls to the standard programming functions are intercepted. The function calls are routed to alternative implementations of the standard programming functions, and the alternative implementations are used to collect availability metrics for the plurality of applications. Manager threads may be used for internal monitoring of application execution. Applications may be modified with additional instructions to monitor program execution and automatically generate output comprising an execution history.

15 Claims, 12 Drawing Sheets

U.S. PATENT DOCUMENTS

| | | | |
|---|---|---|---|
| 7,293,260 B1 * | 11/2007 | Dmitriev | 717/130 |
| 7,353,507 B2 * | 4/2008 | Gazdik et al. | 717/159 |
| 7,424,723 B2 * | 9/2008 | Rangarajan | 719/330 |
| 7,478,371 B1 * | 1/2009 | Gove | 717/128 |
| 7,506,316 B2 * | 3/2009 | Vertes | 717/130 |
| 7,512,935 B1 * | 3/2009 | Cobb | 717/130 |
| 7,523,191 B1 * | 4/2009 | Thomas et al. | 709/224 |
| 7,536,680 B2 * | 5/2009 | Berry et al. | 717/130 |
| 7,555,777 B2 * | 6/2009 | Swimmer et al. | 726/23 |
| 7,587,709 B2 * | 9/2009 | Chilimbi et al. | 717/130 |
| 2002/0144138 A1 * | 10/2002 | Maliszewski | 713/200 |
| 2002/0152455 A1 * | 10/2002 | Hundt et al. | 717/131 |
| 2003/0028680 A1 * | 2/2003 | Jin | 709/313 |
| 2003/0056200 A1 * | 3/2003 | Li et al. | 717/128 |
| 2004/0003375 A1 * | 1/2004 | George et al. | 717/124 |
| 2004/0025165 A1 * | 2/2004 | Desoli et al. | 719/310 |
| 2004/0068560 A1 * | 4/2004 | Oulu et al. | 709/224 |
| 2004/0088719 A1 * | 5/2004 | Gazdik et al. | 719/330 |

OTHER PUBLICATIONS

"Performance Analysis of Distributed Applications with ANSAmon"; B. Meyer, M. Heineken, and C. Popien; Feb. 1995; Aachen University of Technology, Computer Science IV; Aachen, Germany.

* cited by examiner

| Metric | Description |
| --- | --- |
| allocated-memory | The amount of memory in bytes that a program has dynamically allocated. |
| allocated-objects | The count of memory objects that a program has dynamically allocated. |
| cpu-utilization | The fraction of the total time spent actually computing or processing data, as opposed to waiting for users, other programs, etc. |
| current-threads | The number of threads that currently exist within a program. |
| file-handle-count | The number of opened files within a program. |
| heap-size | Heap size includes live memory plus any and all overhead associated with the performance management system's management of the heap (data structures, fragmentation, and other internal use of memory). |
| live-memory | The amount of memory, in bytes, that has been dynamically allocated and has not been freed. It includes both reachable memory and leaked memory that has not been collected. |
| live-objects | The count of objects that have been dynamically allocated and have not been freed. It includes both reachable objects and leaked objects that have not been collected. |
| number-of-heaps | The count of how many heaps are in use by a process. |
| physical-memory | Real or actual memory (e.g., RAM), in bytes, that the operating system has allocated to this application. |
| reachable-memory | Memory, in bytes, that the program can actually access legitimately through program variables. Thus it does not include leaked memory. |
| system-time | The amount of time, in seconds, that a program has spent in the "system", as opposed to application code. |
| threads-created | The total number of threads created in a program. This includes both threads that currently exist and threads that have been destroyed. |
| total-virtual-memory | The maximum amount of committed virtual memory that can be in use on a computer, in bytes. |
| user-cpu-utilization | "CPU utilization", given in seconds, is typically separated into multiple components. The "user" portion is the amount of time spent in the program code itself, as a fraction of the total time, as opposed to the operating system. |
| user-time | The amount of time, in seconds, that a program has spent in application code, as opposed to the operating system. |
| virtual-memory | Memory, in bytes, that the operating system has allocated to a program. This memory may be "physical" (backed by RAM), or swapped out (backed by disk), or unallocated (not backed by anything), if it has not been referenced. |
| wall-time | The amount of actual time, in seconds, that a program has been alive. |

Figure 3A

| Metric | Description |
|---|---|
| collected-objects | The count of leaked objects that have been automatically freed by the Runtime Agent. |
| collected-memory | The amount of leaked memory, in bytes, that has been automatically freed by the Runtime agent. Note: This metric is reported in the console as Recovered Memory. |
| corrected-overwrites | The count of memory overwrites that have been corrected by the Runtime Agent. |
| corrected-write-after-free | The count of memory write-after-frees that have been corrected by the Runtime Agent. |
| exception-count | The number of exceptions that the program has raised. |
| heap-lock-contentions | Heap lock contentions occur when an acquisition attempt is made, but some other thread of the process is in the middle of making a heap request, and so this thread must wait. A large number of heap lock contentions (i.e., a high rate) indicates that dynamic memory allocation is a performance or scalability problem. |
| leaked-memory | Memory, in bytes, that has been allocated by a program, not explicitly freed, but which is no longer referenced. Leaked memory is thus wasted, since it still contributes to program memory requirements, but cannot be used. |
| leaked-objects | The count of objects that have been allocated by a program, not explicitly freed, but which are no longer referenced. |
| multiple-frees | A multiple-free occurs when a program explicitly frees the same object more than once. This can lead to corruption of the memory allocation system, and hence of program memory areas. "Multiple-frees" is the number of such instances. |
| total-lock-contentions | A program "lock" is a synchronization resource used to mediate access from multiple threads or CPUs. If one thread has locked a resource, and another thread attempts to access it, the second thread is said to "contend" for the lock. A large number of lock contentions (i.e., a high rate) may hurt performance or scalability. "Total-lock-contentions" is the count of contentions from all types of locks. |
| uncorrected-overwrites | A memory overwrite occurs when a program stores a value beyond the actual bounds of a memory object. Typically these are uncorrected and could corrupt other program memory. "Uncorrected-overwrites" is the number of such instances. |
| uncorrected-write-after-free | A memory write-after-free occurs when a program explicitly frees a dynamically-allocated object, then continues to store into it. Typically these are uncorrected, and could corrupt other program memory. "Uncorrected-write-after-free" is the number of such instances. |
| wild-frees | A wild free occurs when a program explicitly frees some memory location that was not dynamically allocated in the first place. This can lead to corruption of the memory allocation system, and hence of program memory areas. "Wild-frees" is the number of such instances. |

Figure 3B

| Metric | Description |
|---|---|
| cpu-count | The number of CPUs in a computer. |
| file-handle-count-limit | The maximum number of open files within a program. |
| physical-memory-limit | The maximum amount of RAM, in bytes, that the operating system will allocate to a particular process. |
| physical-memory-size | The total amount of RAM, in bytes, on a particular computer. |
| used-virtual-memory | The total virtual memory committed for use across all programs on a computer, in bytes. |
| virtual-memory-limit | The maximum amount of virtual memory, in bytes, that a program could allocate. |

Figure 3C

| Metric | Description |
|---|---|
| collections | The count of how many collections have been run by the Runtime Agent. |

Figure 3D

| Metric | Description |
|---|---|
| -rate | Change over each interval (per minute). Typically rates are presented across the last FocalPoint polling interval. |
| -trend | Linear regression over process lifetime (per minute) |
| -max | Maximum over lifetime |
| -avg | Average over lifetime |

Figure 3E

| Instrumentation options | |
|---|---|
| -v | Print out version information and exit. |
| -h | Print out help message and exit. |
| -metrics | Instrument for metrics only (default). If neither -metrics or -forensics is specified, it will be instrumented for metrics only. |
| -forensics | Instrument for forensics only. |

Figure 5A

| Other options | |
|---|---|
| -full | Instrument for all features; i.e., both metrics and forensics |
| -q | Suppress most instrumentation progress output. |
| -qi | Suppress already-instrumented output. |
| -s | Strip line number tables and local variable tables from output. |
| -no-manifest-update | Do not alter archive manifests of instrumented archives. |
| -d <out-dir> | Place instrumented classes/jars and .tj1 files into a directory tree starting at <out-dir>. Defaults to the current working directory. |
| -label <label> | Associates class file with a given string label. |
| -log <log-file> | Log instrumentation progress in <log-file>. |
| -p <policy.opt> | Instrument classes and jar files according to the policies found in the <policy.opt> file. |
| -j <map-file.jar> | Places mapfiles in <map-file.jar>. |
| -sourcepath <source-path> | Stores given path to Java source files in mapfiles. |
| -batch <batch-file> | Specifies a file containing a batch of files to instrument, one filename per line. |
| -bs <backup-suffix> | Specifies a suffix for backing up original class files (default is ".bak"). |
| -ts <MMddyyyyHH:mm:ss> | Instrument only those classes modified after the specified time. |
| -tf <MM dd DD yy yyyy HH hh mm ss> | Pass an alternate time format to use with '-ts', suitable for the Java SimpleDateFormat class. |
| -r <dir> | Instrument all class and jar files in and below <dir>. |

Figure 5B

INTERNAL MONITORING OF APPLICATIONS IN A DISTRIBUTED MANAGEMENT FRAMEWORK

BACKGROUND OF THE INVENTION

1. Field of the Invention

This invention is related to the field of application performance management and, more particularly, to internal monitoring of applications in a distributed management framework.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

Typically, a significant portion of any IT budget is incurred in trying to sustain business objectives. Without the ability to peer into the quality of application software, the benefits of other IT investments cannot easily be seen, and efforts spent on ensuring optimal performance of infrastructure components may never be appreciated. IT organizations are often required to manage deployment of business-critical applications that have poor reliability, performance, or scalability. Server-based enterprise applications present a particularly significant challenge for IT organizations trying to provide required service levels while controlling IT infrastructure costs. It is desirable to provide improved systems and methods for application performance management, health monitoring, and error resolution.

SUMMARY OF THE INVENTION

Various embodiments of systems and methods described herein may provide internal monitoring of applications in a distributed management framework. The distributed management framework may comprise a plurality of applications and application servers. In one embodiment, each of the applications is configured to make function calls to standard programming functions. The function calls to the standard programming functions may be intercepted and routed to alternative implementations of the standard programming functions. Alternative implementations of the standard programming functions may be used to collect availability metrics for the applications.

In one embodiment, a manager thread may be started inside each of the plurality of applications. The manager threads may be used to monitor execution of the plurality of applications in a production environment. For example, the manager threads may be used to detect hung processes.

In one embodiment, the program code of a monitored application may be modified to include additional instructions. The additional instructions may be used to monitor execution of the monitored application in a production environment. In response to a triggering event in the execution of the monitored application, output may be automatically generated. The output may comprise an execution history for the monitored application.

BRIEF DESCRIPTION OF THE DRAWINGS

FIG. 3A is a table which shows metrics for the monitoring of user application activity according to one embodiment.

FIG. 3B is a table which shows metrics for the detection and/or correction of user application errors according to one embodiment.

FIG. 3C is a table which shows system metrics related to internal monitoring of applications according to one embodiment.

FIG. 3D is a table which shows metrics for other runtime agent activity according to one embodiment.

FIG. 3E is a table which shows derived metrics related to internal monitoring of applications according to one embodiment.

FIG. 5A is a table which shows instrumentation options according to one embodiment.

FIG. 5B is a table which shows other options related to instrumentation according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In one embodiment, a performance management system may include internal monitoring of applications for management of distributed enterprise applications. In one embodiment, the performance management system may provide monitoring of application reliability, performance, and scalability through a console that reports on problems. In one embodiment, the performance management system may provide solutions to common software problems with tuning solutions that prevent software faults from becoming application failures. In one embodiment, the performance management system may provide root-cause analysis through detailed forensic snapshots that can reconstruct the chain of events leading up to an application fault or failure.

Figure 1:
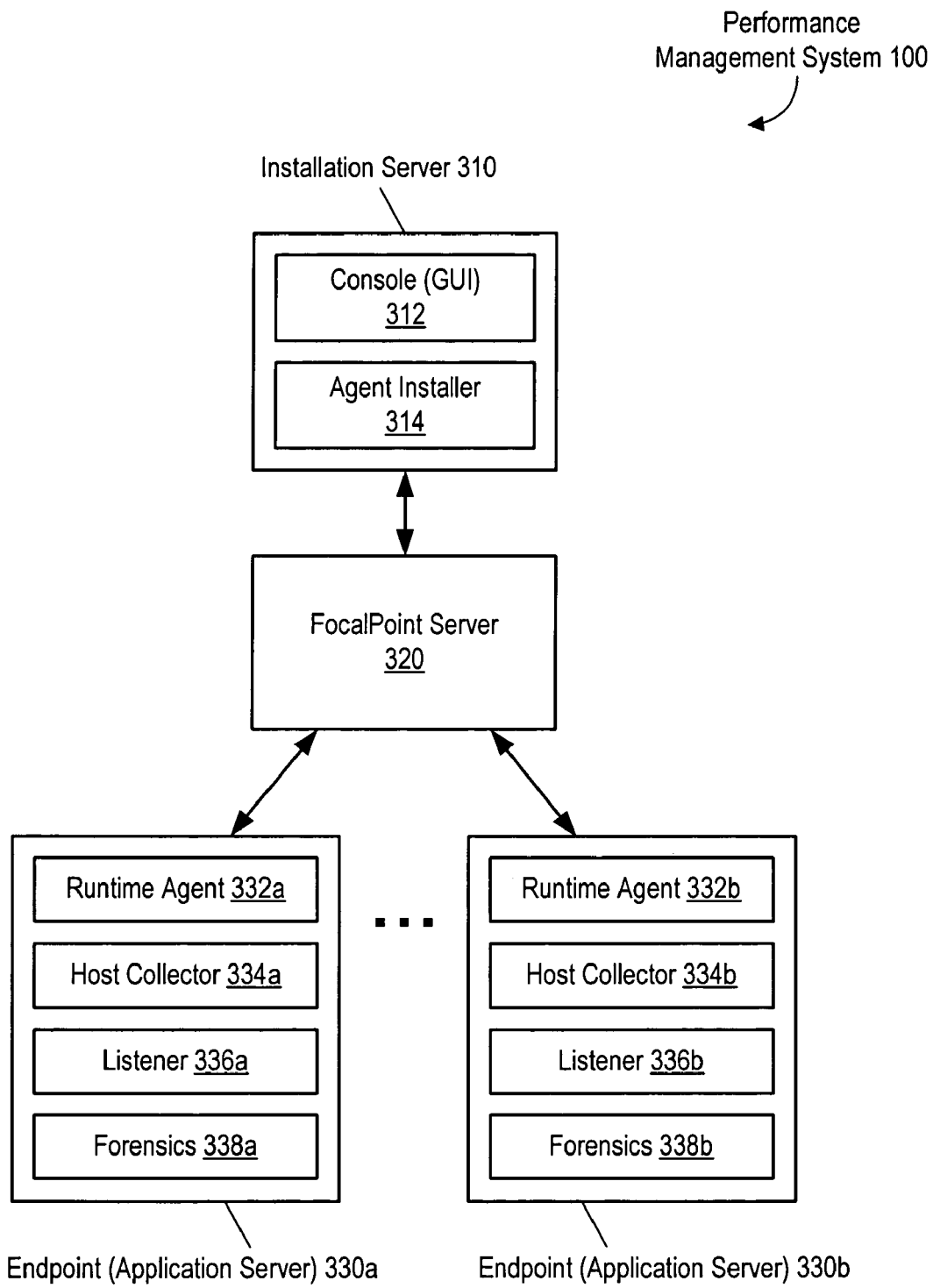
FIG. 1 illustrates components of a performance management system including internal monitoring of applications according to one embodiment.

FIG. 1 illustrates components of a performance management system 100 including internal monitoring of applications according to one embodiment. The Runtime Agent 332a and the Runtime Agent 332b shown in FIG. 1 may be referred to collectively as the Runtime Agent(s) 332. The Host Collector 334a and the Host Collector 334b shown in FIG. 1 may be referred to collectively as the Host Collector(s) 334. The Listener 336a and the Listener 336b shown in FIG. 1 may be referred to collectively as the Listener(s) 336. Forensics 338a and Forensics 338b shown in FIG. 1 may be referred to collectively as Forensics 338 or Forensics Agent(s) 338. The Endpoint or Application Server 330a and the Endpoint or Application Server 330b shown in FIG. 1 may be referred to collectively as the Endpoint(s) or Application Server(s) 330. In one embodiment, the performance management system 100 may enable operators and administrators to manage and improve the scalability and reliability of their existing application software through visualization of an application's health and dynamic optimization and remediation of software bottlenecks and errors. To monitor usage of dynamic resources and provide facilities for enhancing the behavior of application software, a Runtime Agent 332 may intercept many of the well-defined APIs used by programmers in the implementation of application programs. The Runtime Agent 332 may be integrated with application programs using in-process instrumentation of the application image.

By modifying the in-process image of an application rather than the file stored on disk, the performance management system is minimally invasive. By using interception techniques in place of debugging modes (e.g., the Unix ptrace service), the performance management system may be used to diagnose, optimize, or remediate problems without the severe performance overhead or security risks that are typically associated with debuggers and profilers. In one embodiment, installation and integration of the Runtime Agent 332 and its associated components may be accomplished by an Administrator without developer intervention.

In one embodiment, the Runtime Agent 332 runs in application programs to monitor and enhance their health. The Runtime Agent 332 may insert probes into the applications and intercept calls into the system infrastructure to allow monitoring and enhancement. Runtime Agents 332 may be implemented as shared or dynamically-loadable libraries. Different agents may be provided for different platforms and underlying programming languages. In one embodiment, the Runtime Agent 332 is implemented as a set of DLLs (e.g., on computer systems using a Microsoft Windows®OS). In one embodiment, the Runtime Agent 332 is implemented as a set of shared libraries (e.g., on Unix-based computer systems). These libraries run inside the application process, thereby bypassing the overhead associated with traditional, out-of-process monitoring tools. In general, the appropriate Runtime Agents 332 are automatically selected, without the need for user knowledge of this structure.

In one embodiment, a Host Collector 334 process runs on each monitored server 330 and collects metrics, alerts, and self-correction updates from the Runtime Agents 332 for the various monitored applications on the host 330. The Host Collector 334 may add additional per-host metrics and periodically provide the collected information to a FocalPoint Server 320.

In one embodiment, the FocalPoint Server 320 provides a Console 312 with metrics, health, and correction and forensics information. The FocalPoint Server 320 may also archive health information to provide for the viewing of data over time in the Console 312.

In one embodiment, the Console 312 is an operational interface for the performance management system. The Console 312 may be used to view metrics, monitor application health, and review recommended corrections. The Console 312 may be used to depict metrics and other information in overall summary form, with a user-selected time-frame. The Console 312 may be used to drill down to module level to identify specific custom or vendor libraries. The Console 312 may be used to change product configurations, intervene with or re-configure user applications, and display alerts. An alert is an indication of an exceptional event. Alerts may be discovered by the performance management system itself, and the performance management system be configured by the user to be triggered by metrics exceeding thresholds. In one embodiment, an Agent Installer 314 distributes and tracks the performance management system components across the distributed installation. The Console 312 and Agent Installer 314 may reside on an Installation Server 310.

In one embodiment, a Listener 336 may run on each application server 330 where the performance management system components are installed. The Listener 336 may handle install and upgrade requests and transfer data for the Host Collector 334. In one embodiment, a Listener 336 may be installed temporarily on the FocalPoint Server 320 but deleted during the installation.

In one embodiment, a component called Forensics 338 may optionally capture relevant system information and the exact sequence of statement execution across all threads when an application fails or at other times specified by the user. Users may view forensics files using a Forensics Viewer.

An EndPoint 330 is an application server on which various components such as a Runtime Agent 332, Host Collector 334, Listener 336, and, optionally, Forensics 338 have been installed. For purposes of illustration, FIG. 3 depicts two EndPoints 330 and one FocalPoint 320. However, other numbers and combinations of EndPoints and FocalPoints may be used in the performance management system.

Figure 2:
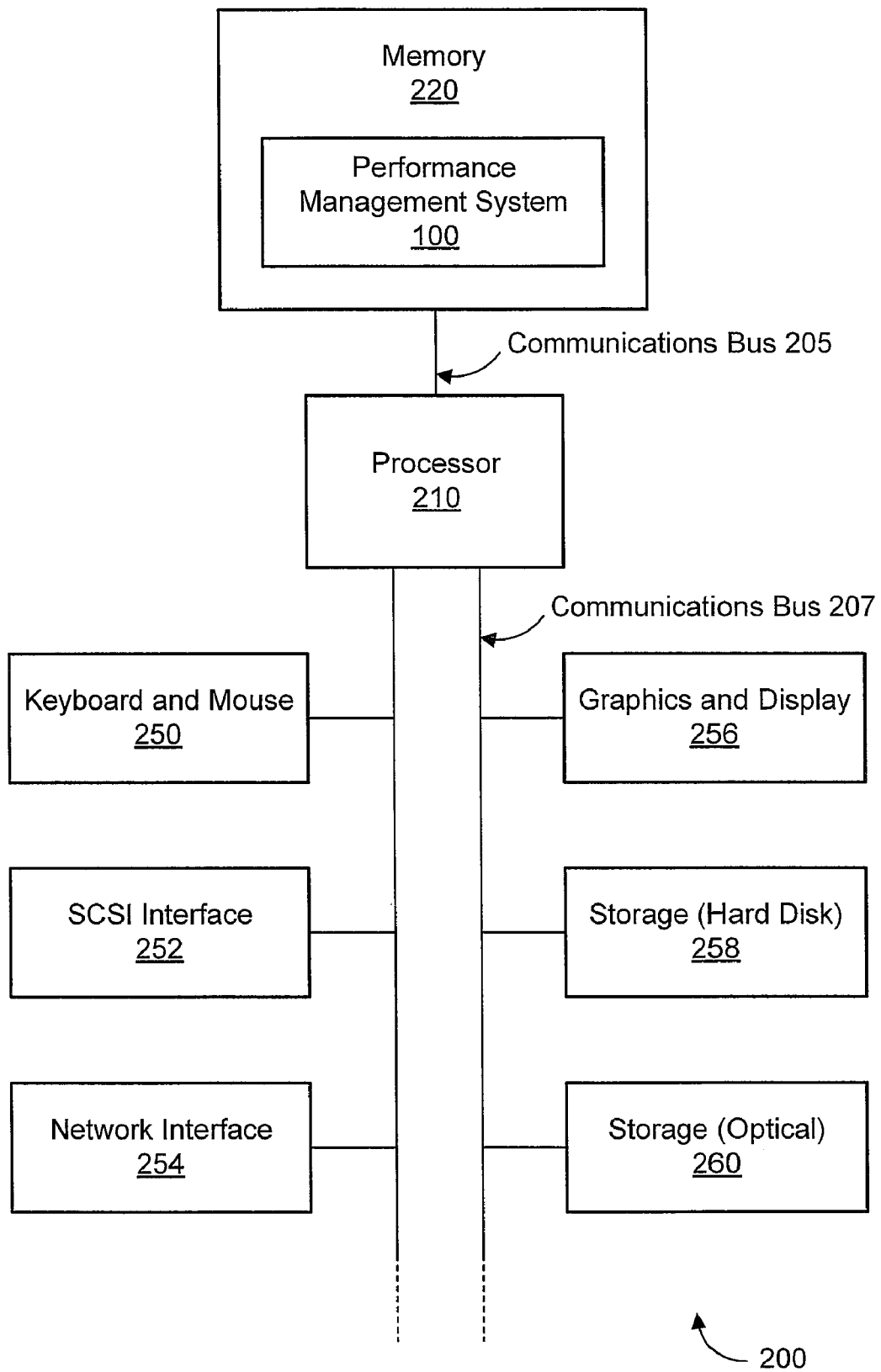
FIG. 2 illustrates components of an exemplary computer system with which embodiments of a system and method for performance management may be implemented.

The performance management system 100 of FIG. 1 may be executed by one or more networked computer systems. The various components of the performance management system 100 may reside on the same computer system, on different computer systems, or on an arbitrary combination of computer systems. FIG. 2 is an exemplary block diagram of such a computer system 200. The computer system 200 includes a processor 210 and a memory 220 coupled together by communications bus 205. The processor 210 can be a single processor or a number of individual processors working together. The memory 220 is typically random access memory (RAM), or some other dynamic storage device, and is capable of storing instructions to be executed by the processor 210. For example, the instructions may include instructions for the performance management system 100. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface 254, a graphics & display device 256, a hard disk 258, and/or a CD-ROM 260, all of which are coupled to the processor 210 by a communications bus 207. The network interface 254 may provide a communications link to one or more other computer systems via a LAN (local area network), WAN (wide area network), interne, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

In one embodiment, the environment is the set of applications and hosts that make up the user's sphere of interest, which we model as the following hierarchy: Environment (user-defined), Application (user-defined), Process (system-defined, running on a single Host), Component (user-defined), Module (system-defined), Code (symbol, stack-trace, source). In one embodiment, the environment may be referred to within the performance management system as "All Applications." An application is a software solution, such as various Commercial Off-The Shelf (COTS) products or custom applications. An application may contain multiple executables, shared objects, and other suitable components. An application instance is a running application. The application instance may include multiple processes running on multiple CPUs or computer systems. As defined within an environment, a process is an operating system process or task, typically comprising a main executable and several dynamically-loaded or shared libraries. As defined within an environment, a component is a logical part of a process, generally including one or more logically related modules in a process. As defined within an environment, a module is a binary element of a process or component, such as an executable or shared library, a class in a programming environment and/or execution environment such as Java™, or a component such as an EJB (Enterprise JavaBean™) or other J2EE™ component.

The Runtime Agents 332 may collect availability metrics for application programs running on the monitored application servers 330. Availability metrics may include, for example, metrics related to memory errors, heap fragmentation, lock contentions, signals, and hung process detection. The FocalPoint 320 may provide higher-level aggregation of metrics.

In one embodiment, the Runtime Agents 332 may collect the metrics listed in FIGS. 3A-3E. FIG. 3A is a table which shows metrics for the monitoring of user application activity according to one embodiment. FIG. 3B is a table which shows metrics for the detection and/or correction of user application errors according to one embodiment. FIG. 3C is a table which shows system metrics according to one embodiment. FIG. 3D is a table which shows metrics for other runtime agent activity according to one embodiment. FIG. 3E is a table which shows derived metrics according to one embodiment. The derived metrics shown in FIG. 3E may be created using combinations of the base metrics shown in FIGS. 3A through 3D.

In one embodiment, any of the listed metrics may be displayed either as current values or graphed over time. In one embodiment, each of the metrics listed in Table 1 may have the following configuration options: enable on/off; threshold that denotes "warning" level (e.g., depicted in yellow in Console); and threshold that denotes "error" level (e.g., depicted in red in Console). For some metrics, the threshold may be a single such event, for example a hung process or an abnormally terminated process. In general, the metrics listed in FIGS. 3A-3E are available across all supported operating environments. One exception is Java, for which some metrics, particularly memory errors, may not be applicable.

Figure 4:
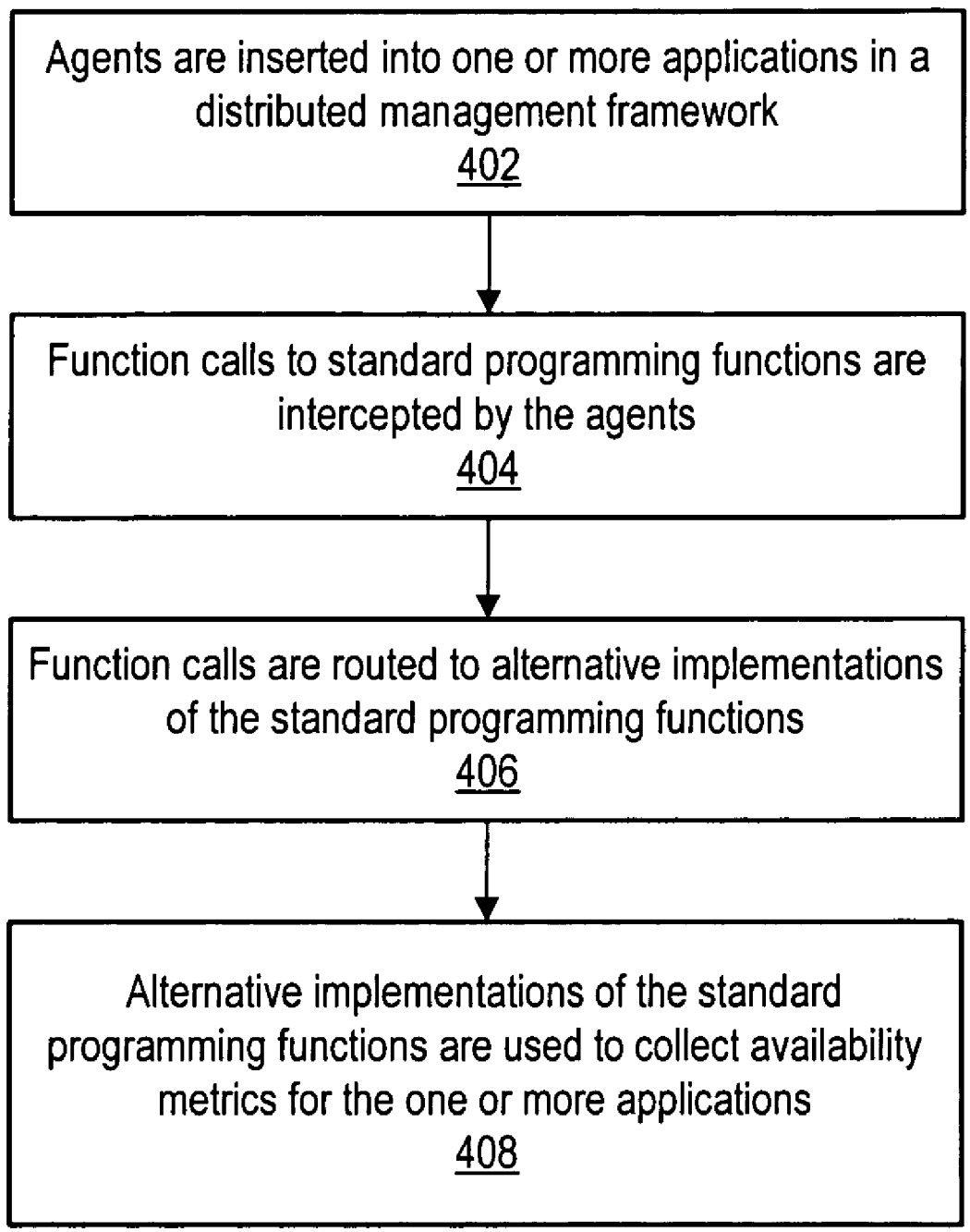
FIG. 4 is a flowchart which illustrates a method for internal monitoring of applications using function call interception according to one embodiment.

FIG. 4 is a flowchart which illustrates a method for internal monitoring of applications according to one embodiment. In 402, agents (e.g., Runtime Agents 332) are inserted into a plurality of applications on a monitored computer system (e.g., an application server 330). In one embodiment, an agent is inserted into an application process when the application is launched. The application images in memory, and not the applications as stored on disk, may be modified by the insertion of the agents.

Each of the applications is configured to make function calls to standard programming functions. The standard programming functions may include, for example, functions provided by a particular programming language (e.g., memory functions such as malloc, free, new, delete, etc. in a C/C++ environment) and OS-specific or platform-specific functions (e.g., HeapAlloc functions in a Windows® environment). In 404, function calls to the standard programming functions are intercepted. In one embodiment, the agents are configured to perform the interception of the function calls. The function calls may be intercepted in a production environment as well as in a development environment, testing environment, or other suitable environment. As used herein, the term "production environment" is a computing environment in which end users may use an application to accomplish day-to-day functions. By contrast, the term "development environment" is a computing environment in which developers (e.g., programmers) may develop and/or test unfinished applications. A production environment includes deployed applications, not applications that are under development.

In 406, the function calls are routed to alternative implementations of the standard programming functions instead of the standard implementations. The alternative implementations may comprise libraries or other shared resources that replace the functionality of standard libraries and OS functions. In 408, the alternative implementations of the standard programming functions may be used to collect availability metrics for the one or more applications. The alternative implementations may reside inside the application processes, where they monitor resources such as memory usage.

The availability metrics may then be used by the performance management system to analyze application health and resource usage, make recommendations, and implement corrective actions. In one embodiment, the performance management system may comprise a distributed management framework as described with reference to FIG. 1. The distributed management framework may comprise various combinations of applications on various servers and platforms. The distributed management framework may be configured by an Administrator to monitor a subset of the applications and/or servers using the method shown in FIG. 4. These various combinations of applications may then be managed using the Console 312.

In one embodiment, a method referred to as injection may be used by the Administrator to insert the Runtime Agent 332 into a specific application. Injection may take place through interaction with the server's program loader. In one embodiment, injection may be enabled for applications (e.g., C/C++ applications) in a Windows® environment by modifying a central configuration file. The configuration file may be edited by adding strings for the executables to be injected:

native.runtime.Inject=<executable>;<executable>; . . . .

In one embodiment, each term <executable> can be an executable name (e.g., myapp.exe) or an executable name and path (e.g., C:\Program Files\myapp.exe). In one embodiment, applications will not be injected if the host is booted in "Safe Mode." (e.g., in Windows® 2000 and higher).

In one embodiment, e.g., on Unix-based systems, injection is part of the way an executable is invoked. Typically in such environments, an executable is invoked as a command with arguments. To invoke the executable with injection, a command such as "gsinject" may be used to launch the executable. The administrator should decide whether child processes launched by the executable should also be injected. In one embodiment, forked processes are always injected. If a process is forked and then exceed, it will only be injected if the -e flag is used in one embodiment. In one embodiment, the syntax of the injection command "gsinject" is as follows:

gsinject [-n|e] [-i bytes] [-v] [-h] [-c license-file] command [arguments]

If the option -n is used, child processes launched using exec will not be injected. In one embodiment, -n is the default. If the option -e is used, child processed launched via exec and fork will be injected. If the option -i is used, the initial heap size will be increased by the specified number of bytes. If the option -v is used, messages about injection will be emitted to standard output. If the option -h is used, help text for the command will be displayed. If the option -c is used, the location of the text license file may be specified, and any default locations or variables overridden. For example, to inject into myprog and all child processes, the following command may be used:

gsinject -e myprog arg1 arg2

In addition to injection, instrumentation may be used for J2EE™ and Java programs. Instrumentation inserts probes in Java and native programs. Instrumentation may also be used to insert probes that generate forensic reports for both Java and native programs. Instrumentation may use compiler technology to perform binary instrumentation on executables, DLLs, shared libraries, J2EE Enterprise Java Beans, Java archives, and other suitable software components.

In one embodiment, the performance management system may provide two ways to instrument Java code: statically and dynamically. Static instrumentation is a manual command line operation that allows the administrator to instrument class and archive files individually. Dynamic instrumentation allows the administrator to automatically instrument a Java program upon launching it.

For static instrumentation in one embodiment, the Java code is compiled into bytecodes before it is instrumented. In one embodiment, a Java application may be instrumented using a command such as "tfj-instr." In one embodiment, this command will enable only metrics (and not forensics) by default; one or the other or both may be specified using command line options. The Java program may then be executed in the normal way, provided that a performance management system runtime JAR should be available. To make tfj-runtime.jar available, tfj-runtime.jar should be placed in the JRE's extension directory and also on the classpath. To put it on the classpath, either set or add the CLASSPATH environment variable or set or add to the -classpath Java command-line option (often abbreviated as -cp).

FIG. 5A is a table which shows instrumentation options for an instrumentation command according to one embodiment. FIG. 5B is a table which shows other command-line options for an instrumentation command according to one embodiment. In one embodiment, the tjf-instr command may have the following syntax, where the options are illustrated in FIGS. 5A and 5B:

tfj-instr [-v] [-h] [-metrics|forensics] [-full] [-q] [-qi] [-s]
[-no-manifest-update] [-d <out-dir>] [-label <label>]
[-log <log-file>] [-p<policy.opt>] [-j<map-file.jar>]
[-sourcepath <source-path>] [-batch <batch-file>]
[-bs <backup-suffix>] [-ts <MMddyyyyHH:mm:ss>]
[-tf <MMddyyyyHH:mm:ss>] {-r <dir>} *.class . . .
*.jar . . . .

In one embodiment, J2EE components may be instrumented and deployed. First, the classes to be traced may be instrumented. Second, the forensics runtime JAR (tfj-runtime.jar) may be placed in the extensions directory of the Java Virtual Machine (JVM) that will be running the application server 330. If this is not possible, the runtime JAR should at least be in the classpath of the executing application server 330.

For dynamic instrumentation, a class loader may be used to automatically launch the Java program and instrument all associated class files. To use the dynamic instrumentation tool, the class file should be compiled first. Second, the following command should be entered: tfj-ijava <ClientClass>, where <ClientClass> is the name of the class file which the user wants to instrument and open. To dynamically instrument the class without using the tfj-ijava script, the following command should be entered, with a CLASSPATH setting that includes tfj-runtime.jar: java incert.instrument.Launcher <ClientClass>. In one embodiment, all class files contained within <ClientClass> are instrumented automatically while they execute. Map (.tj1) files may be saved into a directory hierarchy. Whereas static instrumentation produces a new set of class files, dynamic instrumentation may eliminate the need for maintaining both an uninstrumented and instrumented code base in a development environment.

Figure 6:
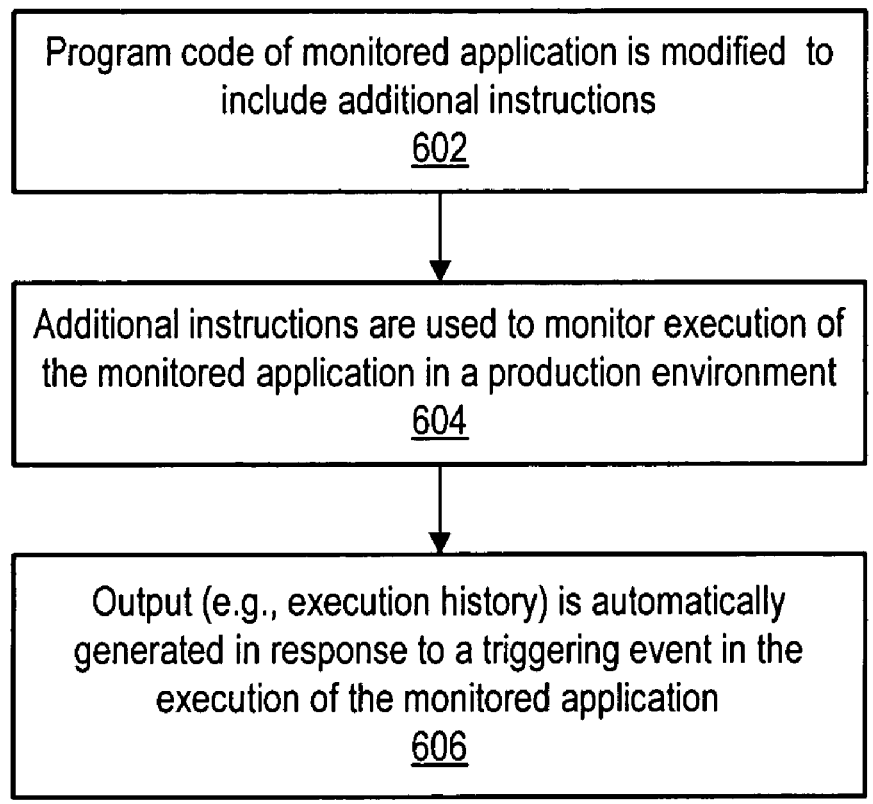
FIG. 6 is a flowchart which illustrates a method for internal monitoring of applications using additional internal program code according to one embodiment.

In one embodiment, the Forensics Agent 338 may identify the root cause of failures in applications (e.g., C/C++ applications) in development, testing, and production. By monitoring program execution and system information, the Forensics Agent 338 may pinpoint the exact source of the failure, thereby helping the administrator to rapidly recover from the problem, minimizing debugging time, and eliminating the need to re-create problems. FIG. 6 is a flowchart which illustrates a method for internal monitoring of applications using additional internal program code according to one embodiment. The program code of a monitored application may be modified to include additional instructions in 602. As used herein, the term "program code" includes machine code in addition to other types of instructions which may be executed or interpreted without an additional compilation step. In one embodiment, for example, the Forensics Agent 338 may automatically insert lightweight agents into program modules (e.g., C/C++ modules) and Java bytecode through instrumentation.

As the instrumented program runs, the Forensics Agent 338 continuously monitors its execution in 604. The Forensics Agent 338 may capture the exact sequence of statement execution across all threads and relevant system information. When a triggering event such as an exception, error, or termination occurs in the instrumented application, the Forensics Agent 338 automatically generates and outputs forensics files that capture the execution history of the target program in 606. The execution history may comprise a history of source statement execution. The forensics files may then be analyzed to identify the cause of the failure and quickly fix the problem without needing to re-create the failure in a test environment. In one embodiment, forensics files may also be generated through an external command at an arbitrary time.

In one embodiment, the Forensics Agent 338 may add additional instructions to the program code of the target application. The additional instructions may be used to record relevant aspects of the program's execution in a production environment. In one embodiment, the additional instructions may record an execution trace of the program's execution on a per-thread basis. In one embodiment, the additional instructions may record entry to and exit from function calls executed during program execution. In one embodiment, the additional instructions may capture exceptional control transfers and record details of the associated exceptions. In one embodiment, the additional instructions may track the creation of specific data objects and record metrics for the creation events.

In one embodiment, (e.g., a Windows® environment), a program may be compiled in the usual manner for use with the Forensics Agent 338. Any program files (e.g., EXE, DLL, and OCX files) may then be instrumented by inserting agents into the program files. New, instrumented versions of the program files are thereby created. When the instrumented modules are executed, forensics files may be generated when exceptions, errors, or abnormal terminations occur. In one embodiment, forensics files may also be generated manually at any time.

In one embodiment, (e.g., a Solaris® environment), a program may be compiled for use with the Forensics Agent 338 with debugging enabled, and a forensics wrapper program may be used during the link process to instrument the code. When the instrumented modules are executed, forensics files may be generated when signals, errors, or abnormal terminations occur. In one embodiment, forensics files may also be generated manually at any time.

In one embodiment (e.g., a Java® environment), a class and/or archive may be instrumented for use with the Forensics Agent 338. Forensics files may be generated when the instrumented code is executed.

Figure 7:
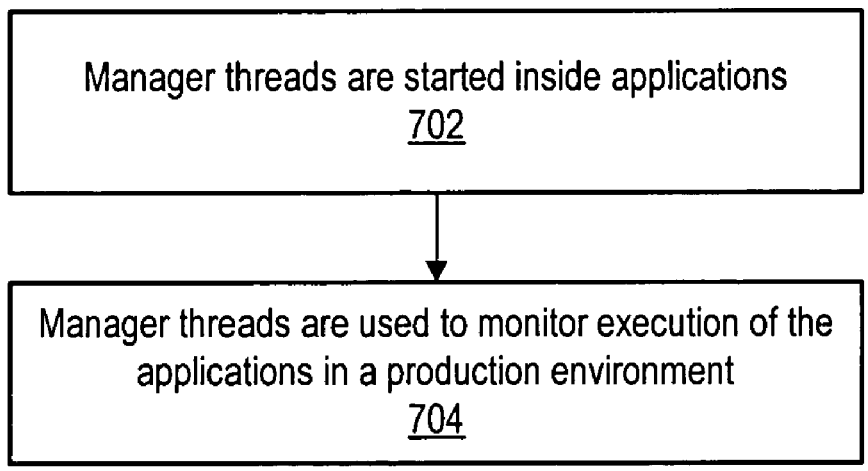
FIG. 7 is a flowchart which illustrates a method for internal monitoring of applications using a manager thread according to one embodiment.

FIG. 7 is a flowchart which illustrates a method for internal monitoring of applications using a manager thread according to one embodiment. A manager thread may be started inside each of the plurality of applications in 702. The manager threads may be used to monitor execution of the plurality of applications in a production environment in 704. For example, a manager thread inside a particular process may be used to determine that the particular process is hung. If the manager thread does not receive sufficient time to perform its activities and keep in contact with the host collector, the process can be considered hung. This internal method of hung process detection is typically more accurate than the normal method, i.e., testing whether an application responds to external stimuli. In one embodiment, after collecting availability metrics for the applications using internal monitoring, the manager threads may be used to trigger output of the availability metrics to an external recipient (e.g., a FocalPoint or Console). In one embodiment, manager threads may be used to trigger garbage collection of memory resources.

Figure 8:
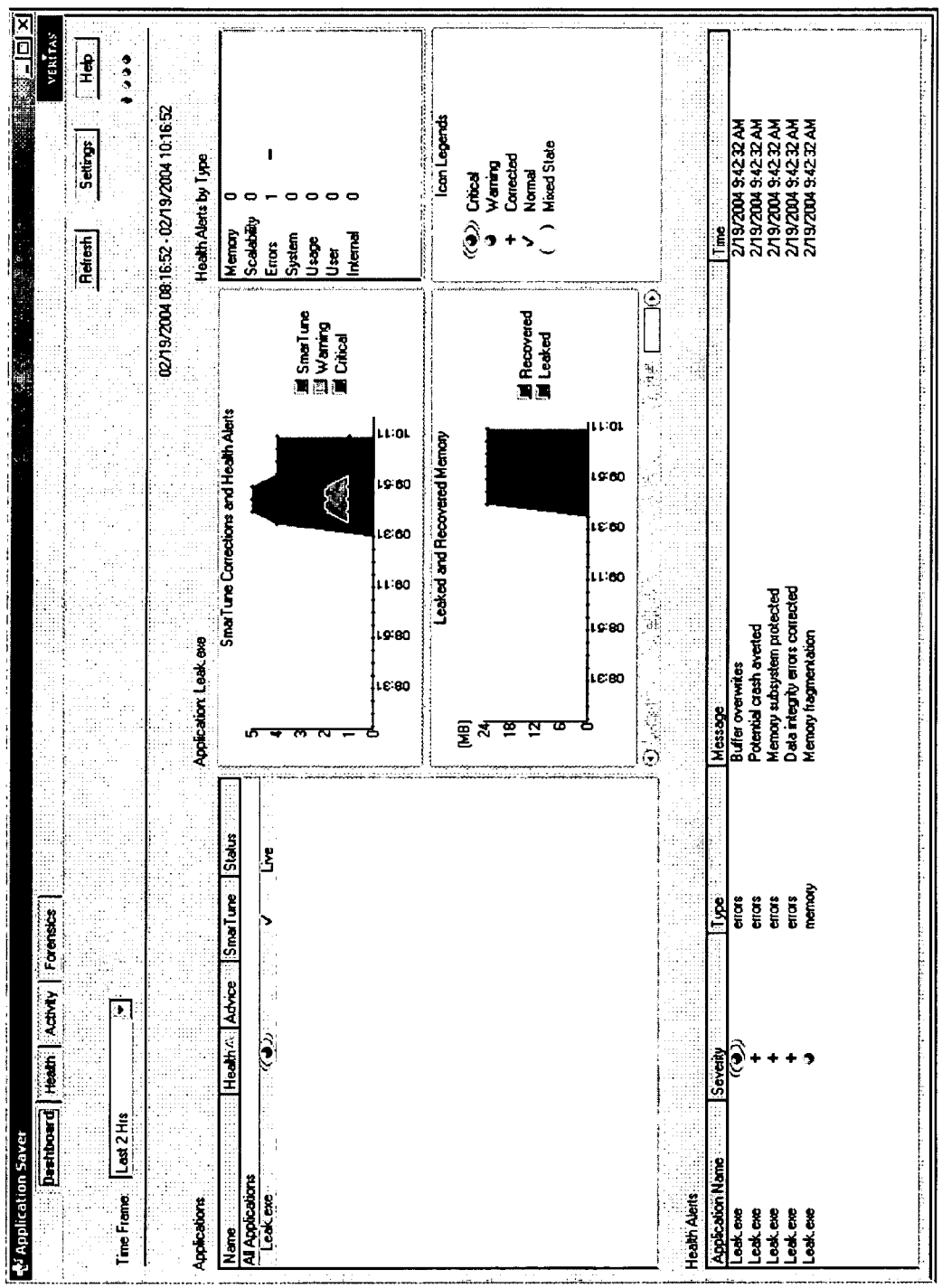
FIG. 8 illustrates a user interface for internal monitoring of applications including a Dashboard workspace according to one embodiment.
Figure 9:
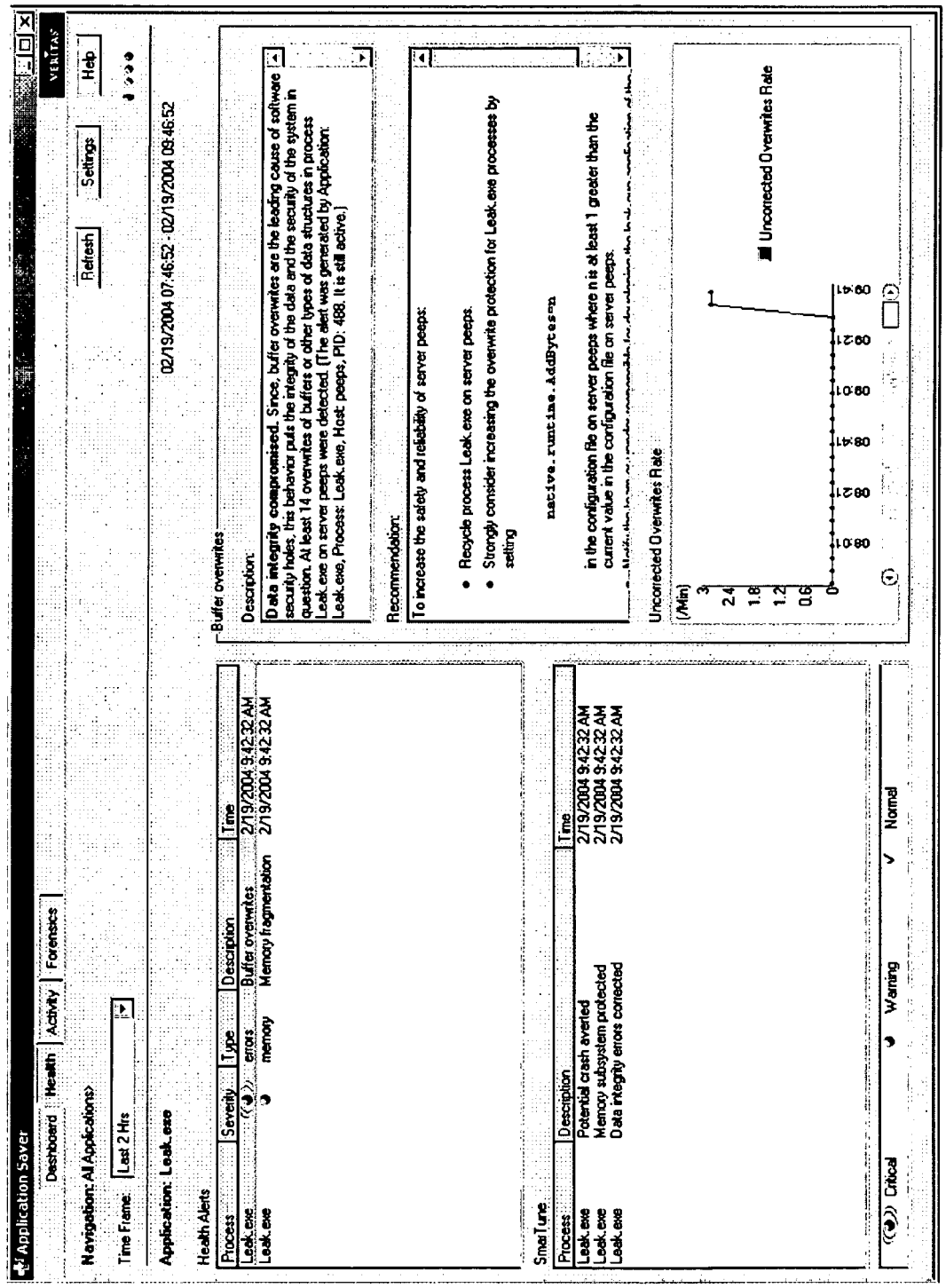
FIG. 9 illustrates a user interface for internal monitoring of applications including a Health workspace according to one embodiment.
Figure 10:
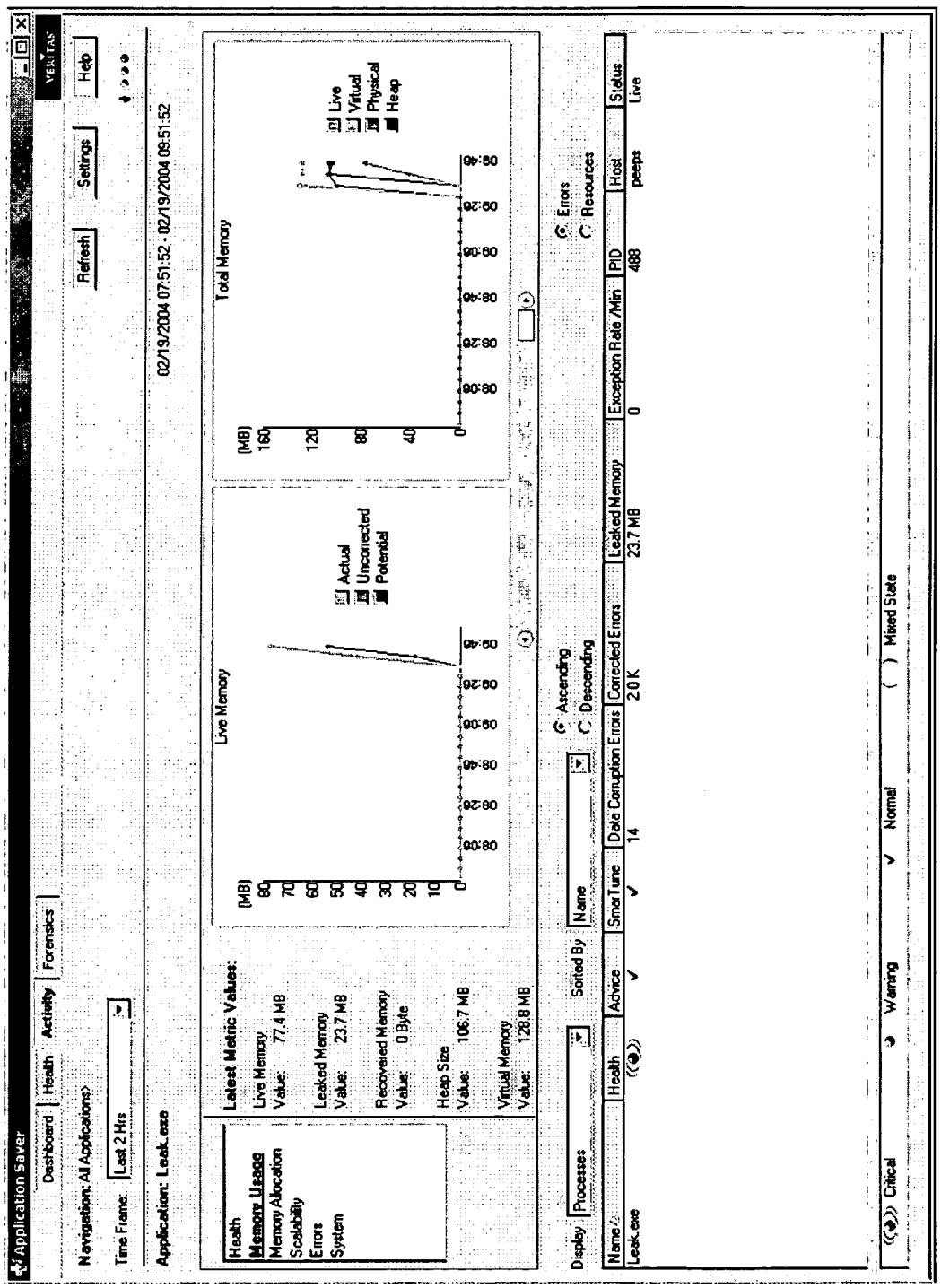
FIG. 10 illustrates a user interface for internal monitoring of applications including an Activity workspace according to one embodiment.
Figure 11:
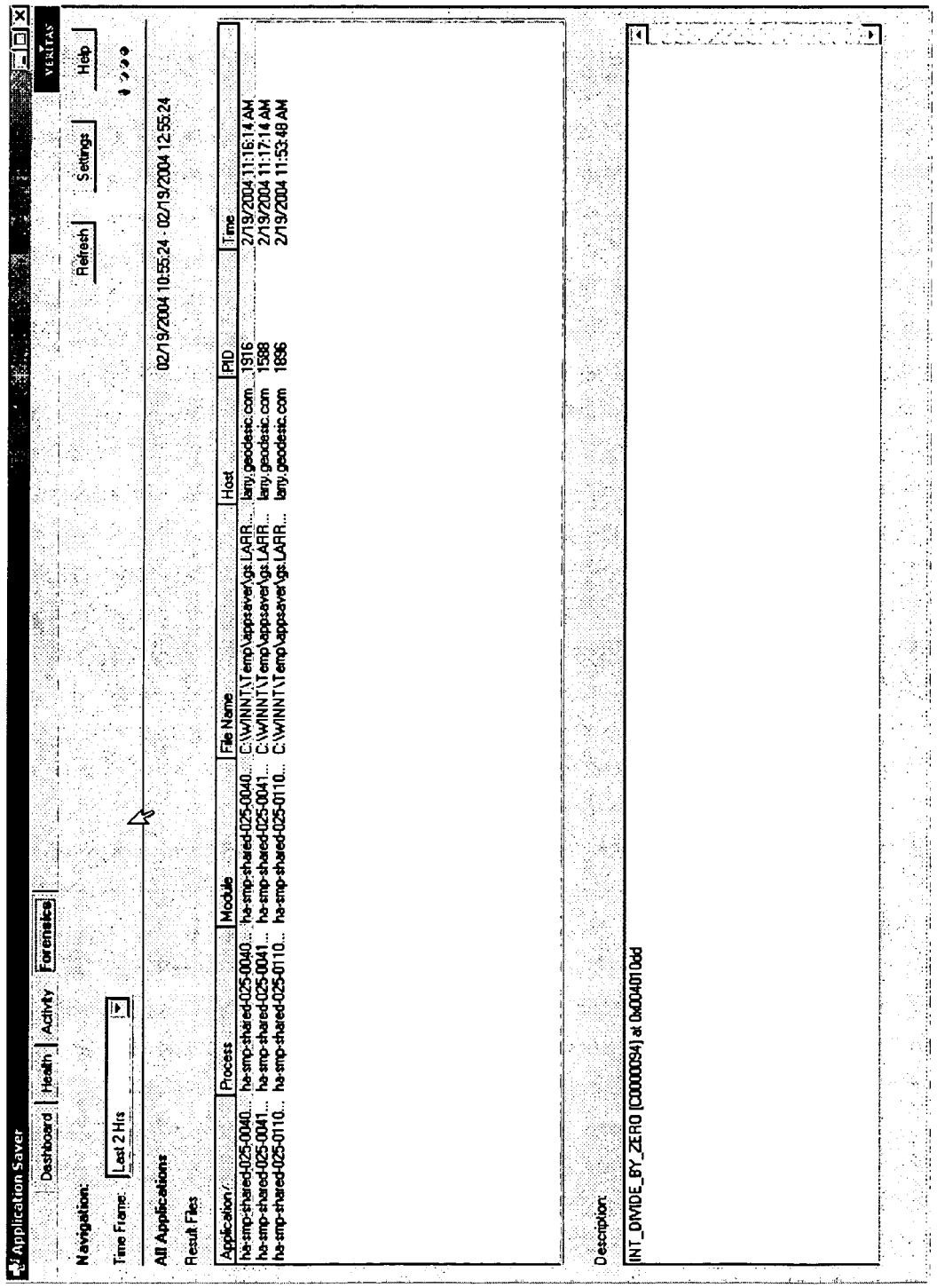
FIG. 11 illustrates a user interface for internal monitoring of applications including a Forensics workspace according to one embodiment.

FIGS. 8-11 are screenshots which illustrate a user interface for internal monitoring of applications according to one embodiment. In one embodiment, the Console 312 provides four main workspaces. In one embodiment, an individual workspace may be selected from the Console 312 by selecting the appropriate tab. FIG. 8 illustrates an example of a Dashboard workspace according to one embodiment. The Dashboard workspace may provide an overview of all applications, current health status and self-corrections. Health alerts are displayed by type and in overview. FIG. 9 illustrates an example of a Health workspace according to one embodiment. The Health workspace may include an event viewer area that provides a list of alerts, self-corrections, details on the selected event, and recommendations where appropriate. FIG. 10 illustrates an example of an Activity workspace according to one embodiment. The Activity workspace may provide a main metrics-display area. The metrics may be viewed by all applications or by drill-down through the overall environment. FIG. 11 illustrates an example of a Forensics workspace according to one embodiment. The Forensics workspace may list further data, such as forensic snapshot files.

It is further noted that any of the embodiments described above may further include receiving, sending or storing instructions and/or data that implement the operations described above in conjunction with FIGS. 1-11 upon a computer readable medium (also referred to herein as a "carrier medium"). Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for use in a distributed management framework comprising a plurality of applications, wherein each of the plurality of applications is configured to make function calls to standard programming functions, the method comprising:

inserting a respective agent into each of the plurality of applications upon a launch of each of the plurality of applications;

by using the agents, intercepting the function calls to the standard programming functions made by each of the plurality of applications, wherein each of the standard programming functions comprises memory functions and implementation program code which is located external to each of the plurality of applications calling the standard programming functions;

routing the function calls to alternative implementations of the standard programming functions, wherein each of the alternative implementations of the standard programming functions is internal to a respective each of the plurality of applications calling the standard programming functions;

executing one of the alternative implementations of the standard programming functions inside an application process of one of the plurality of applications instead of executing the implementation program code of the corresponding standard programming function, wherein the executed one of the alternative implementations of the standard programming functions replaces functionality of the corresponding standard programming function; and using the alternative implementations of the standard programming functions to collect availability metrics for each of the plurality of applications.

2. The method of claim 1, wherein the intercepting the function calls comprises intercepting the function calls in a production environment.

3. The method of claim 1, further comprising: modifying program code of at least one of the plurality of applications to enable the intercepting the function calls to the standard programming functions.

4. The method of claim 1, further comprising: using the availability metrics for performance management of each of the plurality of applications in the distributed management framework.

5. The method of claim 1, further comprising: configuring the distributed management framework to monitor a subset of the plurality of applications.

6. The method of claim 1, further comprising: aggregating the availability metrics for each of the plurality of applications at a console for performance management.

7. A computer-readable storage medium comprising program instructions for use in a distributed management framework comprising a plurality of applications, wherein each of the plurality of applications is configured to make function calls to standard programming functions, wherein the program instructions are computer-executable to implement:

inserting a respective agent into each of the plurality of applications upon a launch of each of the plurality of applications;

by using the agents, intercepting the function calls to the standard programming functions made by each of the plurality of applications, wherein each of the standard programming functions comprises memory functions and implementation program code which is located external to each of the plurality of applications calling the standard programming functions;

routing the function calls to alternative implementations of the standard programming functions, wherein each of the alternative implementations of the standard programming functions is internal to a respective each of the plurality of applications calling the standard programming functions;

executing one of the alternative implementations of the standard programming functions inside an application process of one of the plurality of applications instead of executing the implementation program code of the corresponding standard programming function, wherein the executed one of the alternative implementations of the standard programming functions replaces functionality of the corresponding standard programming function; and using the alternative implementations of the standard programming functions to collect availability metrics for each of the plurality of applications.

8. The computer-readable storage medium of claim 7, wherein the intercepting the function calls comprises intercepting the function calls in a production environment.

9. The computer-readable storage medium of claim 7, wherein the program instructions are further computer-executable to implement: modifying program code of at least one of the plurality of applications to enable the intercepting the function calls to the standard programming functions.

10. The computer-readable storage medium of claim 7, wherein the program instructions are further computer-executable to implement: aggregating the availability metrics for each of the plurality of applications at a console for performance management.

11. A system comprising:
at least one processor; and
at least one memory coupled to the at least one processor, wherein the at least one memory stores program instructions that are executable by the at least one processor to:

insert a respective agent into each of the plurality of applications upon a launch of each of the plurality of applications;

use the agents to intercept one or more function calls to one or more standard programming functions made by each of the plurality of applications, wherein each of the one or more standard programming functions comprises memory functions and implementation program code which is located external to each of the plurality of applications calling the one or more standard programming functions;

route the function calls to alternative implementations of the one or more standard programming functions, wherein each of the alternative implementations of the one or more standard programming functions is internal to a respective each of the plurality of applications calling the one or more standard programming functions; and execute one of the alternative implementations of the standard programming functions inside an application process of one of the plurality of applications instead of executing the implementation program code of the corresponding standard programming function, wherein the executed one of the alternative implementation of the standard programming functions replaces functionality of the corresponding standard programming function; and use the alternative implementations of the one or more standard programming functions to collect availability metrics for each of the plurality of applications.

12. The system of claim 11, wherein the function calls are intercepted in a production environment.

13. The system of claim 11, wherein the program instructions are further executable by the at least one processor to: modify program code of at least one of the plurality of applications to enable the interception of the function calls to the standard programming functions.

14. The system of claim 11, wherein the program instructions are further executable by the at least one processor to: aggregate the availability metrics for each of the plurality of applications at a console for performance management.

15. A system for use in a distributed management framework comprising a plurality of applications, wherein each of the plurality of applications is configured to make function calls to standard programming functions, the system comprising:

means for inserting a respective agent into each of the plurality of applications upon a launch of each of the plurality of applications;

means for using the agents to intercept the function calls to the standard programming functions made by each of the plurality of applications, wherein each of the standard programming functions comprises memory functions and implementation program code which is located external to each of the plurality of applications calling the standard programming functions;

means for routing the function calls to alternative implementations of the standard programming functions, wherein each of the alternative implementations of the standard programming functions is internal to a respective each of the plurality of applications calling the standard programming functions;

means for executing one of the alternative implementations of the standard programming functions inside an application process of one of the plurality of applications instead of executing the implementation program code of the corresponding standard programming function, wherein the executed one of the alternative implementations of the standard programming functions replaces functionality of the corresponding standard programming function; and means for using the alternative implementations of the standard programming functions to collect availability metrics for each of the plurality of applications.

* * * * *